US006766579B2

(12) United States Patent
Ohkuma

(10) Patent No.: US 6,766,579 B2
(45) Date of Patent: Jul. 27, 2004

(54) METHOD FOR MANUFACTURING AN INK JET HEAD

(75) Inventor: Norio Ohkuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/409,088

(22) Filed: Apr. 9, 2003

(65) Prior Publication Data

US 2003/0198899 A1 Oct. 23, 2003

(30) Foreign Application Priority Data

Apr. 11, 2002 (JP) ....................................... 2002-108794

(51) Int. Cl.[7] ............................ B23P 17/00; G03C 5/00

(52) U.S. Cl. .......................... 29/890.1; 29/847; 29/854; 29/DIG. 16; 430/320

(58) Field of Search ............................ 29/890.1, 25.35, 29/847, 854, DIG. 16, 831; 430/320; 347/47, 44, 45

(56) References Cited

U.S. PATENT DOCUMENTS

| | | | | | |
|---|---|---|---|---|---|
| 5,213,614 | A | * | 5/1993 | Eida et al. | 106/31.52 |
| 5,218,376 | A | | 6/1993 | Asai | |
| 5,478,606 | A | * | 12/1995 | Ohkuma et al. | 427/555 |
| 5,786,832 | A | | 7/1998 | Yamanaka et al. | |
| 5,798,778 | A | | 8/1998 | Kimura et al. | |
| 5,945,260 | A | * | 8/1999 | Miyagawa et al. | 430/320 |
| 6,113,222 | A | | 9/2000 | Ohkuma | |
| 6,139,761 | A | | 10/2000 | Ohkuma | |
| 6,155,673 | A | | 12/2000 | Nakajima et al. | |
| 6,186,616 | B1 | * | 2/2001 | Inoue et al. | 347/45 |
| 6,286,933 | B1 | * | 9/2001 | Murakami et al. | 347/47 |
| 6,305,080 | B1 | | 10/2001 | Komuro et al. | |
| 6,455,112 | B1 | | 9/2002 | Ohkuma et al. | |
| 2002/0001016 | A1 | | 1/2002 | Aono et al. | |

FOREIGN PATENT DOCUMENTS

| | | |
|---|---|---|
| EP | 0 882 593 A | 12/1998 |
| EP | 0 960 733 A | 12/1999 |
| JP | 4-10940 | 1/1992 |
| JP | 4-10941 | 1/1992 |
| JP | 4-10942 | 1/1992 |
| JP | 6-210859 | 8/1994 |
| JP | 6-286149 | 10/1994 |

* cited by examiner

*Primary Examiner*—A. Dexter Tugbang
*Assistant Examiner*—Tai Nguyen
(74) *Attorney, Agent, or Firm*—Fitzpatrick, Cella, Harper & Scinto

(57) ABSTRACT

A method for manufacturing an ink jet head, which is provided with a discharge port member having discharge ports arranged for discharging ink, comprises the step of forming the discharge port member by a first photosensitive resin layer, and a second photosensitive resin layer having water-repellency, which is laminated on the first photosensitive resin layer, and the step of giving pattern-exposure and development to these layers for the formation of a structure having the portion where both the first photosensitive resin layer and the second photosensitive resin layers are removed, and the portion where the second photosensitive resin layer is partially removed.

7 Claims, 7 Drawing Sheets

METHOD FOR MANUFACTURING AN INK JET HEAD

BACKGROUND OF THE INVENTION

1. Field of the Invention

The present invention relates to an ink jet head for generating fine recording droplets used for the ink jet recording method, and also, relates to the method of manufacture therefor. More particularly, the invention relates to a water-repellent process applied to the surface of the head.

2. Related Background Art

For the ink jet head applicable to the ink jet recording method, there have been made various proposals to enhance the performance thereof, such as to obtain a higher image quality at higher speed, among some others. The applicant hereof has made such proposals in Japanese Patent Application Laid-Open No. 04-10940 to Japanese Patent Application Laid Open No. 04-10942, which present ink jet recording methods that make higher image quality possible.

Also, the applicant hereof has proposed in the specification of Japanese Patent Application Laid-Open No. 06-286149 a method for manufacturing an ink jet recording head, which is more preferable than the ink jet recording methods disclosed in the specifications of the aforesaid Japanese Patent Application Laid-Open Nos. 04-10940 to 04-10942. Further, the applicant hereof has proposed separately the water-repellent composition optimally usable for the ink jet head and the mode of utilization thereof a method for burying a water-repellent member on the recessed portion formed on the surface of a head, and the like with respect to the water-repellent process of the head surface.

Also, regarding the water-repellent process of the head surface, the applicant hereof has proposed in Japanese Patent Application Laid-Open No. 06-210859 a method for improving print quality with the provision of a water-repellent area and a non-water-repellent area for the nozzle surface. In other words, in the specification thereof, it is disclosed that when the entire area of the nozzle surface is made water-repellent, ink mist is integrated to become the ink droplet at the time of continuous printing or the like, which is sucked into the discharge port, and may cause non-discharge to occur. On the other hand, according to such disclosure, if the nozzle surface is partially provided with a hydrophilic portion, it becomes possible to collect ink mist on the hydrophilic portion and prevent it from being incorporated into droplets.

However, in accordance with the method disclosed in the specifications of aforesaid Japanese Patent Application Laid-Open Nos. 04-10940 to 04-10942, and the optimal method of manufacture disclosed in the specification of the aforesaid Japanese Patent Application Laid-Open No. 06-286149, the nozzle formation member and the water-repellent member are formed altogether by means-of patterning exposure and development process. This formation brings about a mode in which the water-repellent member remains on the nozzle surface under any circumstances. Therefore, it, is difficult to improve the print quality with the provision of a water-repellent area and a non-water-repellent area as disclosed in the aforesaid Japanese Patent Application Laid-Open No. 06-210859.

Meanwhile, for the improvement of print quality with the provision of the water-repellent area and the non-water-repellent area for the nozzle surface as disclosed in the specification of Japanese Patent Application Laid-Open No. 06-210859, it is arranged to remove the water-repellent material locally by ablation given by the application of excimer laser after the water-repellent member is formed uniformly on the nozzle surface. As a result, there may occur residues by the ablation, and also, it is difficult to make positioning with the discharge ports precisely, thus leading inevitably to the increased numbers of processing steps among some other disadvantages. Here, therefore, the method still has room for improvement.

SUMMARY OF THE INVENTION

Here, the present invention is designed with a view to solving the aforesaid problems. It is an object of the invention to provide an ink jet head capable of providing the water-repellent area and non-water-repellent area for the nozzle surface with the formation of the water-repellent portion and hydrophilic portion for the nozzle surface thereof in exact positioning precision without increasing the number of processing steps, thus enhancing print quality, and also, to provide the method of manufacture thereof.

In order to solve the problems described above, the present invention provides a method for manufacturing an ink jet head, the structure of which is arranged as given below.

The method for manufacturing the ink jet head, which is provided with a discharge port member having discharge ports for discharging ink arranged therefor, comprises the steps of forming an ink flow-path pattern from a soluble resin on a substrate having an ink discharge pressure generating element formed thereon; laminating on the ink flow-path pattern a first photosensitive resin layer for forming the discharge port member; laminating on the first photosensitive resin layer, a second photosensitive resin layer having water-repellency for forming the discharge port member; forming a first latent-image pattern reaching the bottom portion of the first photosensitive resin layer, and a second latent-image pattern extending beyond the second photosensitive resin layer but not reaching the bottom portion of the first photosensitive resin layer, by subjecting the first photosensitive resin layer and second photosensitive resin layer to a pattern exposure simultaneously by use of mask, while controlling partially the exposed area of the exposed portion at the time of applying the pattern-exposure so as to make the depths of latent images produced by the pattern exposure different; forming a hydrophilic portion having the discharge port and first photosensitive resin layer exposed by developing the pattern-exposed first photosensitive resin layer and second photosensitive resin layer; and removing the ink flow-path pattern formed from the soluble resin.

DETAILED DESCRIPTION OF THE PREFERRED EMBODIMENTS

In accordance with the embodiments of the present invention, it is possible to attempt the enhancement of print quality by means of photolithographical technology and technique with the adoption of the aforesaid structure, because the water-repellent portion and hydrophilic portion can be formed for the nozzle surface of an ink jet head in exact positioning precision without increasing the number of processing steps.

Hereunder, in conjunction with the accompanying drawings, the description will be made of the embodiments of the present invention.

FIGS. 1A to 3B are views that schematically illustrate the formation processes of an ink jet head in accordance with one embodiment of the present invention.

Figure 1A:
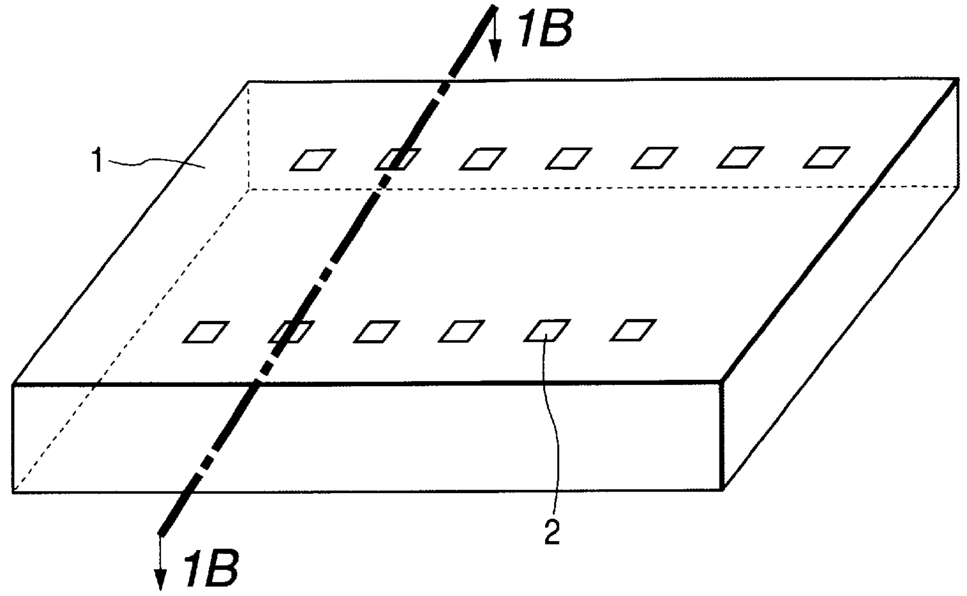
FIGS. 1A, 1B, and 1C are views that illustrate the forming process of an ink jet head embodying the present invention in accordance with a first embodiment thereof.

FIG. 1A shows the state where the heater material 2, that serves as an ink discharge pressure generating element, is arranged on the substrate 1. The heater 2 has electrodes (not shown) connected therewith and gives heat when energized, thus enabling ink to be vaporized for discharging fine ink droplets.

Figure 1B:
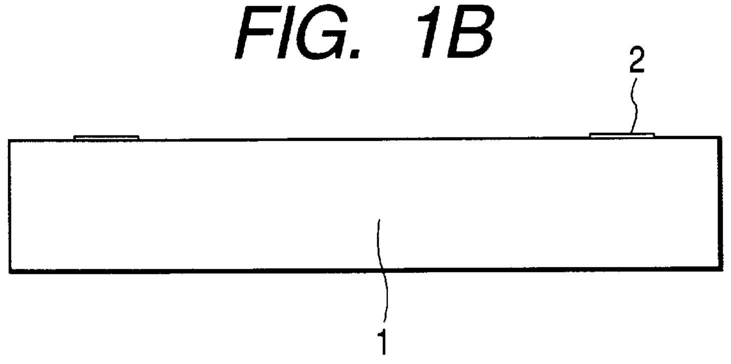

FIG. 1B is a cross-sectional view taken along line 1B—1B in FIG. 1A.

In accordance with the formation processes shown in FIGS. 1A to 3B, the description will be made of a method for manufacturing an ink jet head embodying the present invention.

Figure 1C:
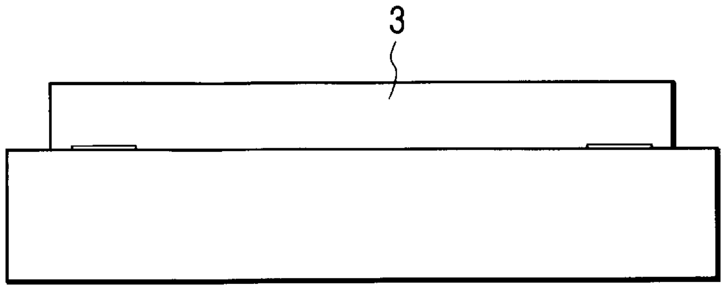
Figure 2A:
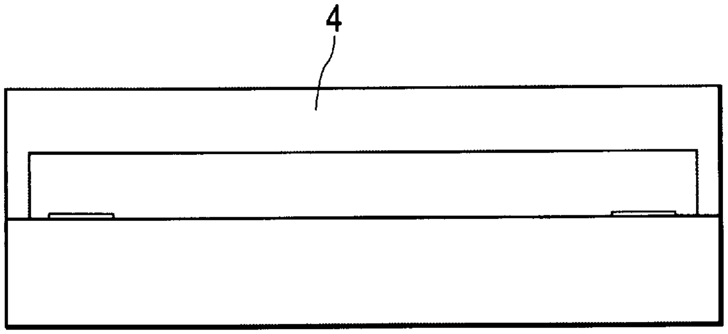
FIGS. 2A, 2B, and 2C are views that illustrate the forming process of an ink jet head embodying the present invention in accordance with a first embodiment thereof in continuation of those represented in FIGS. 1A, 1B and 1C.

At first, on the substrate 1, the die-resist 3, which becomes the die for ink flow path, is formed (FIG. 1C). Next, further, on the aforesaid die-resist 3, a first photosensitive resin layer 4 is formed to be a nozzle formation member (FIG. 2A).

Figure 2B:
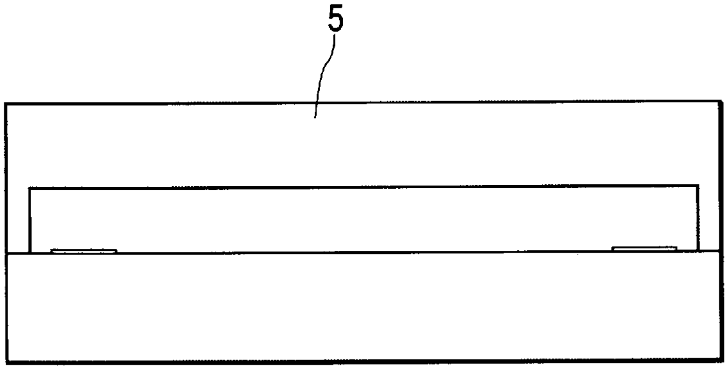

Further, on the first photosensitive resin layer 4, there is formed the second photosensitive resin layer 5, which has mainly water-repellency (FIG. 2B).

Figure 2C:
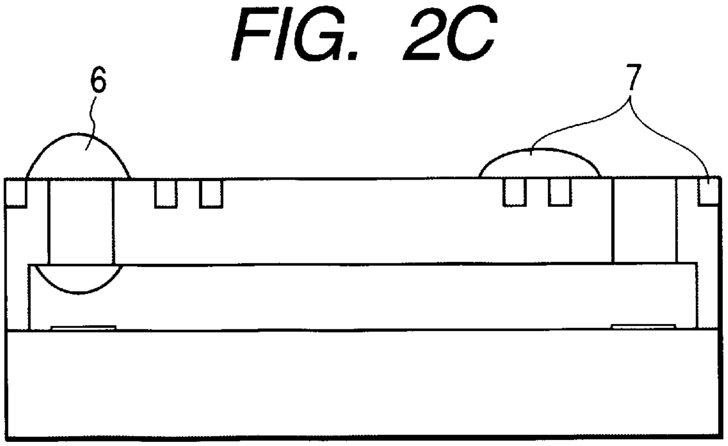

Next, by means of the usual photolithographic techniques, the first photosensitive resin layer 4 and the second photosensitive resin layer 5 are exposed and developed through masks so as to form the hydrophilic portion 7, which can be formed in any positions on the discharge port 6 and the nozzle surface (FIG. 2C).

Here, in accordance with the present embodiment, the mask pattern is set for the ink discharge port formation member in a size to enable the first photosensitive resin layer 4 and the second photosensitive resin layer 5 to be patterned (so that these layers should not remain after development), and also, the mask pattern is set for the hydrophilic portion in a size to enable the second photosensitive resin layer 5 to be patterned, but the first photosensitive resin layer 4 not to be patterned (that is, not to be penetrated at the time of development). On the hydrophilic portion, the second photosensitive resin layer 5, which has water-repellency, is locally lost, and the first photosensitive resin layer 4 is exposed. Therefore, the water-repellency is not developed. This is attainable in such a way that when the patterning exposure is executed, the exposing area of the portion that should be exposed is locally controlled to make the depths of latent images different in order to form the first pattern of latent image (that is, the portion where discharge port is formed), which reaches the bottom portion of the first photosensitive resin layer, and the second pattern of latent image (that is, the hydrophilic portion), which is beyond the second photosensitive resin layer, but does not reach the bottom portion of the first photosensitive resin layer.

Usually, the film thickness of the die-resist 3 is selected in a range of approximately 10 to 40 μm; the film thickness of the first photosensitive resin layer 4, approximately 10 to 40 μm; and the discharge port, approximately φ 10 to 30 μm. Consequently, it is needed to set an aspect ratio at approximately 1:1 to 1:4 (the width of the discharge port:the film thickness of the first photosensitive resin layer 4) when the first photosensitive resin layer 4 is patterned.

Also, since the second photosensitive resin layer 5 is used to obtain the surface water-repellency, and the film thickness thereof is usually adjusted to be approximately 0.1 to 3 μm, the aspect ratio (the width of the discharge port: the film thickness of the second photosensitive resin layer 5) is good enough if it is set at approximately 1:1. For the so-called resist performance, it is preferable to make the aspect ratio higher, but in practice, it is extremely difficult to attain an aspect ratio of 1:4 or more, except by means of some specially arranged condition (such as X-ray exposure).

Here, if a mask having a width pattern sufficiently small relative to the discharge port diameter is used for the formation of hydrophilic portion, it is possible to carry out the patterning of the hydrophilic portion. In other words, if a mask pattern of approximately φ 1 to 3 μm is used, the patterning can be executed sufficiently in consideration of the aspect ratio, because the film thickness of the second photosensitive resin layer 5 is approximately 0.1 to 3 μm. However, since the film thickness of the first photosensitive resin layer 4 is approximately 10 to 40 μm, the patterning can hardly be executed completely.

In this manner, with the mask being designed in consideration of the ratio of the film thickness of the first photosensitive resin layer 4 and the second photosensitive resin layer 5, the discharge port can be formed and the hydrophilic portion can be made in any positions on the nozzle surface by means of one-time patterning (exposure and development processes). This indicates that the discharge port position and the relatively positional precision of the hydrophilic portion can be determined univocally, and that there is no need for increasing the processing steps for the formation of the hydrophilic portion.

The aforesaid description reflects one embodiment of the present invention, but the invention is not necessarily limited to such embodiment. For example, in order to pattern only the second photosensitive resin layer, the following arrangements are also possible:

The arrangement is made to change developers used for the first photosensitive resin layer 4 and the second photosensitive resin layer 5 (setting is made so that the developer used for the second photosensitive resin layer 5 does not develop the first photosensitive resin layer 4).

The arrangement is made to change the sensitivities of the first photosensitive resin layer 4 and the second photosensitive resin layer 5 so as to control and set the aspect ratio of both photosensitive layers at an optimal value.

Like these, with the appropriate adoption of techniques, it becomes possible to form the discharge port and the hydrophilic portion more stable at the same time.

Figure 3A:
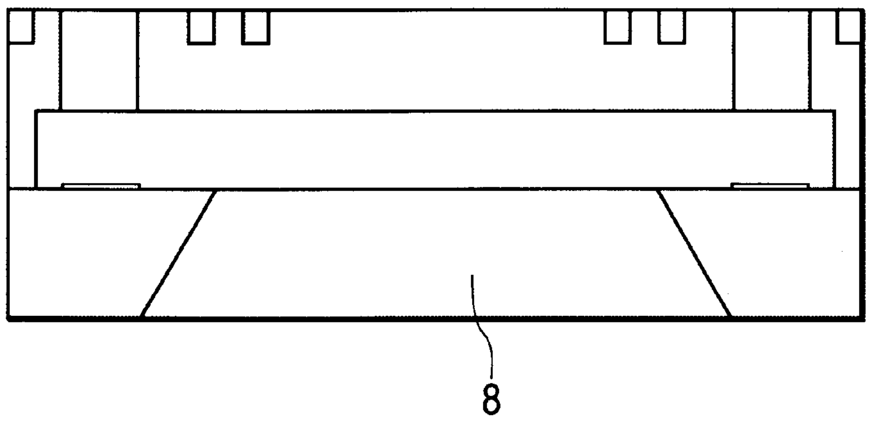
FIGS. 3A and 3B are views that illustrate the forming process of an ink jet head embodying the present invention in accordance with a first embodiment thereof in continuation of those represented in FIGS. 2A, 2B and 2C.
Figure 3B:
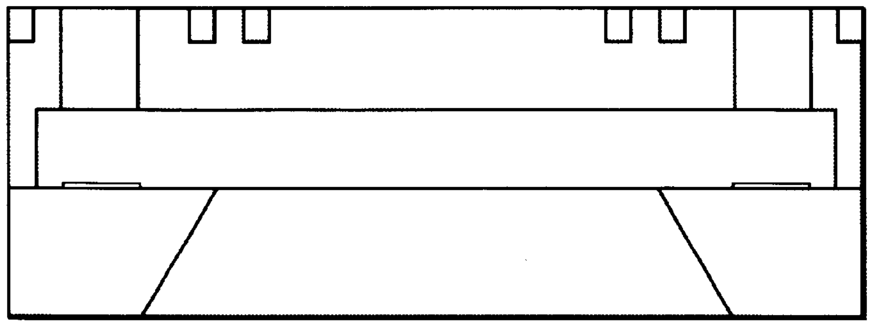

In this way, after the discharge port and the hydrophilic portion are formed, the ink supply port is appropriately formed as shown in FIG. 3A. Further, as shown in FIG. 3B, the die-resist 3 is appropriately removed to produce an ink jet head.

Next, the description will be made of the constituents used for the present invention.

At first, for the first photosensitive resin layer, it is preferable to use a negative-type resist, because this layer, being a part of the nozzle member, should provide a high mechanical strength, ink-resistance property, and close contact capability with the substrate. It is particularly preferable to use cation polymeric substance of epoxy resin.

For the second photosensitive resin layer, it is preferable to use a negative-type resist that contains a functional group, such as fluorine, from which water-repellency against ink is obtainable, and silicon or the like, which has water-repellency.

Embodiments

Hereunder, the description will be made of the embodiments in accordance with the present invention.

First Embodiment

In accordance with the first embodiment of the invention, an ink jet head is produced through the processing steps shown in FIGS. 1A to 3B.

At first, an Si wafer is used for the substrate 1, and TaN is used as the heater material.

Then, ODUR manufactured by Tokyo Ohka Kagaku Kogyo K.K. is used as the die-resist for the formation of the ink flow path pattern (in a film thickness of 13 μm (FIG. 1C)). Further, as the first photosensitive resin layer, the composition shown in Table 1 given below is formed on the ink flow path pattern by means of spin coating (in a film thickness of 12 μm (FIG. 2A)).

TABLE 1

| Item | Product Name | Weight % |
|---|---|---|
| Epoxy resin | EHPE (manufactured by Daicel Chemical Industries, LTD.) | 100 |
| Added resin | 1,4-HFAB (Central Glass K.K.) | 20 |
| Silane coupling material | A-187 (Nippon Unika K.K.) | 5 |
| Photo-cation Polymer catalyst | SP170 (Asai Denka Kogyo K.K.) | 2 |
| Solvent | Ethyl Cellsolve | 75 |

The composition shown in Table 1 is a cation polymeric composition having a negative-type photosensitive property. Further, on the first photosensitive resin layer, the second photosensitive resin layer is formed (FIG. 2B).

The second photosensitive resin layer is the composition shown in Table 2 below.

TABLE 2

| Item | Structure | Weight % |
|---|---|---|
| Fluoric epoxy resin A | 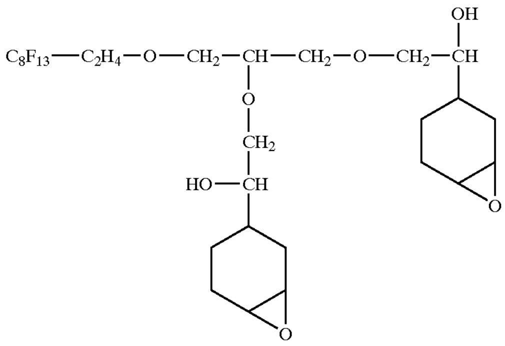 | 35 |
| Fluoric epoxy resin B | 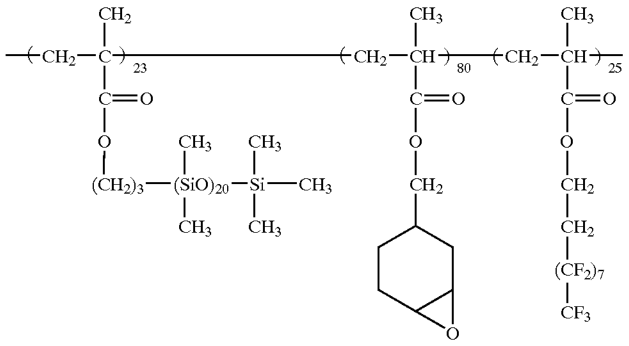 | 60 |
| Photo-cation polymer catalyst | SP170 (Asahi Denka Kogyo K.K.) | 5 |
| Solvent | Methyl isobutyl ketone | 200 |
| | Diglyme | 200 |

The second photosensitive resin layer has a sensitive group that contains fluoric atom in the structure thereof, and demonstrates water-repellency, while it becomes a negative-type photosensitive composition with an epoxy group and a photo-cation polymer catalyst.

When the second photosensitive resin layer is formed, the first photosensitive resin layer has not reacted as yet. Consequently, there is a need for the provision of a structure that does not produce any adverse effect on the first photosensitive resin layer when a coating solvent or the like is selected. For the present embodiment, the composition shown in Table 2 is applied onto a PET film, which is dried to form a dry film, thus completing the formation (in a film thickness of 0.5 μm) by laminating it, while appropriately giving heat and pressure onto the first photosensitive resin layer.

Figure 4A:
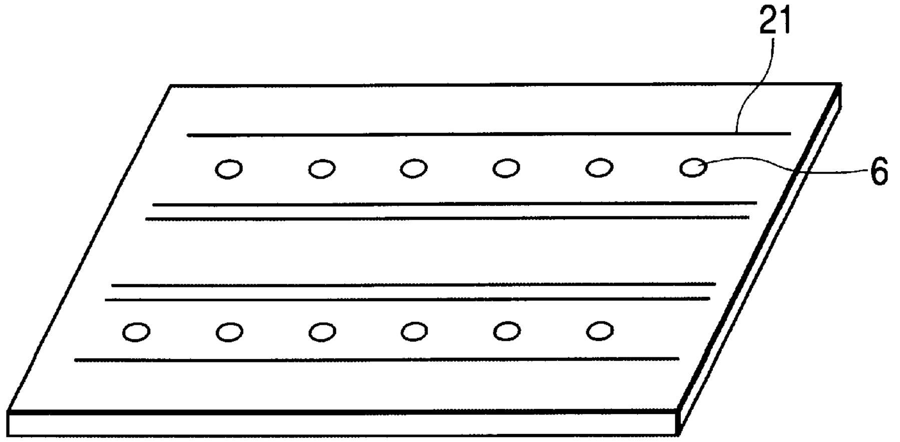
FIG. 4A is a view that shows the mask structure used in the formatting process of the ink jet head in accordance with the first embodiment of the present invention.

Then, by use of the mask aligner MPA 600 manufactured by Canon Inc., exposure is given to the first and second photosensitive resin layers thus formed in an exposure amount of 1.0 J/ $cm^2$ through the mask, which is provided with the patterns of the discharge port and hydrophilic portion. The dimension of the discharge port 6 on the mask is ϕ 22 μm. For the area where the hydrophilic portion is formed, a line 21 of 2 μm is formed (at an interval of 7 μm between each of them) (FIG. 4A). After the exposure, the structure is heated at 90° C. for 4 minutes, and immersed in a developer of methyl, isobutyl ketone/xylene=2/3, and then, rinsed with xylene to form the discharge port portion and the hydrophilic area.

The pattern thus obtained is formed in a dimension of ϕ 20.2 μm at the discharge port portion, and the first and second photosensitive resin layers are removed. On the other hand, in the hydrophilic area, the line 21 of 2 μm on the mask is formed to be 1.8 μm with a depth of 0.7 μm. In other words, whereas the second photosensitive resin layer is removed, the first photosensitive resin layer is scarcely removed. On the line thus formed, there is no second photosensitive resin layer that has water-repellency, and the first photosensitive resin layer is exposed. In this way, it becomes the hydrophilic portion to ink (FIG. 2C).

Next, an ink supply port is formed on the Si wafer by means of anisotropic etching from the base side thereof (FIG. 3A). Lastly, the die-resist is removed. Then, for the purpose of curing the first and second photosensitive resin layers completely, heat treatment is given at a temperature of 200° C. for one hour, thus completing the nozzle (FIG. 3B). For the nozzle obtained in this manner, electrical connections and ink supply means are arranged to make an ink jet head.

Also, for comparison, an ink jet head of the mode having a discharge port formed but not any hydrophilic portion is prepared at the same time.

The ink jet head thus produced is filled with black ink, and solid printing, which is made by discharging ink from all the discharge ports, is continuously performed on an A-4 sized recording sheet in order to observe whether or not disabled discharge occurs by the suction of ink droplets generated by ink mist into any of the nozzles. This observation of disabled discharge is carried out by eyesightto confirm the presence of white stripes (results of non-discharges) on the solidly printed sheet. Here, the evaluation standard is as follows:

A: Almost no white stripe is discernible.

B: One to two white stripes are discernible.

C: Five or more white stripes are discernible.

The results are shown in Table 3.

Second Embodiment

In accordance with a second embodiment of the present invention, an ink jet head is formed with the pattern of the hydrophilic area being changed. All other aspects are the same as those of the first embodiment.

Figure 4B:
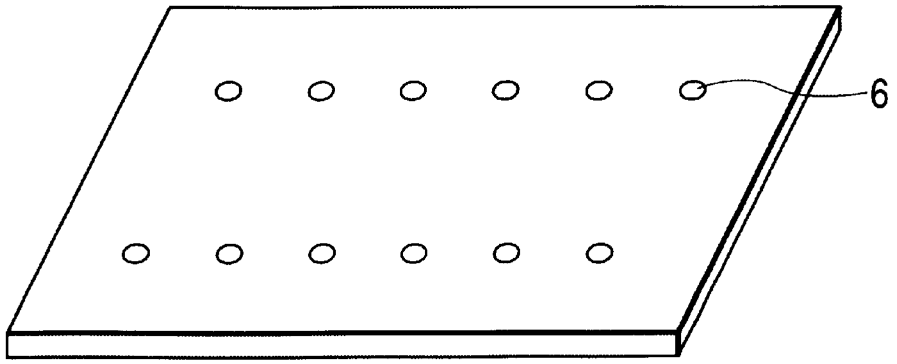
FIG. 4B is a view that shows the forming process of the ink jet head in accordance with the second embodiment of the present invention.
Figure 5:
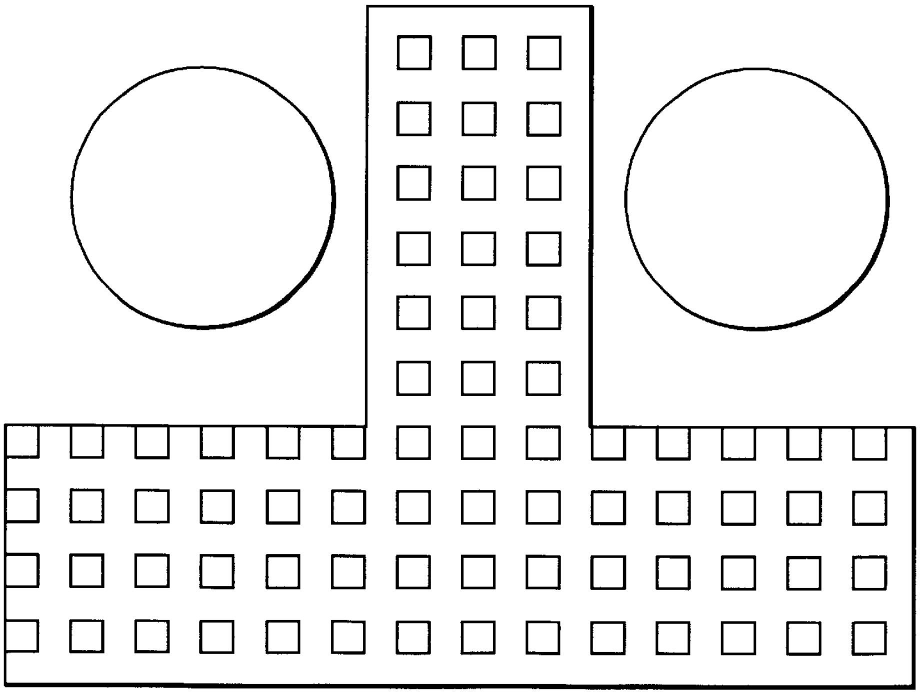
FIG. 5 is a view that shows the mask structure used in the forming process of the ink jet head in accordance with the second embodiment of the present invention.

The mask used for the present embodiment is formed by the discharge port portion and the hatched area as shown in FIG. 4B, and for the hatched area, masks of 2 μm square each are arranged at pitches of 2 μm (see FIG. 5). The finished area corresponding to the mask of 2 μm square is formed to be 1.8 to 2.0 μm square with a depth of 2 μm. The evaluation is made in the same manner as the first embodiment. The results thereof are shown in Table 3.

TABLE 3

| | Partial Hydrophilic area | First sheet | Second sheet | Third sheet | Fourth sheet | Fifth sheet |
|---|---|---|---|---|---|---|
| Embodiment 1 | present | A | A | A | A | B |
| Embodiment 2 | present | A | A | A | A | A |
| Comparative Sample | absent | A | B | B | B | C |

As is clear from the above results, when the hydrophilic area is partially provided for the nozzle surface, it is possible to improve the print quality in continuous printing.

The size and arrangement position of the area where the hydrophilic treatment is given can be selected appropriately in accordance with the mode to be adopted.

Embodiment 3

According to third embodiment of the present invention, the present invention is applied to an electrical assembly in addition to the hydrophilic area provided for the nozzle surface.

Although there are various methods for making electrical connection with the substrate where heaters and nozzles are formed, in recent years there has been practiced the one for which an anisotropic conduction sheet (hereinafter referred to as ACF) is adopted as a technique capable of executing assembling in high density, among some others.

FIGS. 6A to 6E are views that illustrate the fundamental process when the ACF (anisotropic conduction sheet) is used.

Figure 6A:
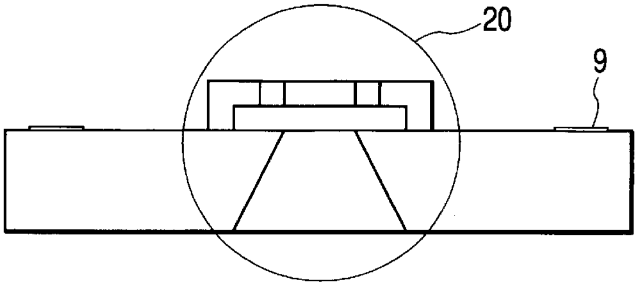
FIGS. 6A, 6B, 6C, 6D, and 6E are views that illustrate the forming process of the ink jet head using an anisotropic conduction sheet (ACF) in accordance with a third embodiment of the present invention.
Figure 6B:
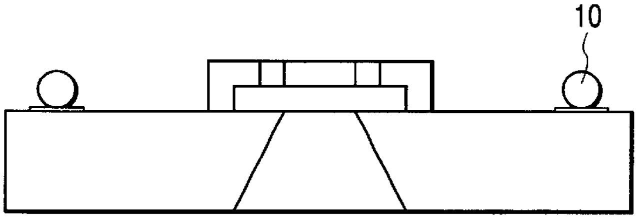
Figure 6C:
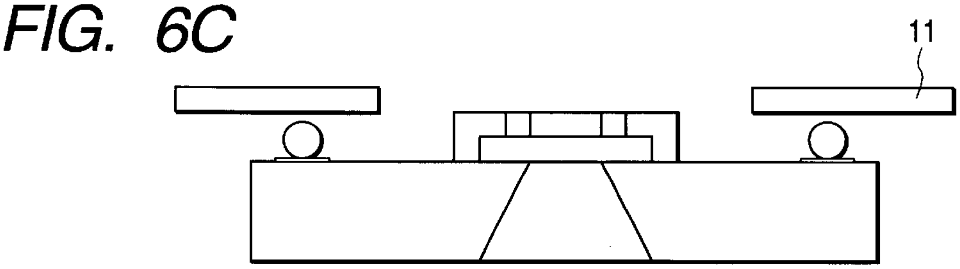
Figure 6D:
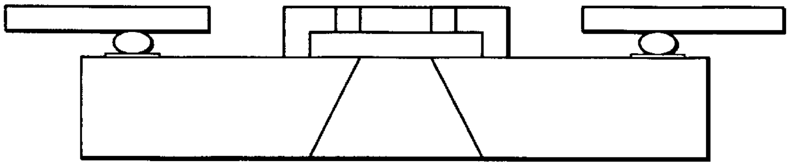

FIG. 6A is a cross-sectional view that shows the chip on which nozzles are formed in a mode where AL pads 9 are arranged around the chip for electrical connection. The portion surrounded by a circle is the nozzle portion 20. Next, on each AL pad, a bump 10 is formed (FIG. 6B). Further, the ACF 11 is positioned (FIG. 6C), and heat and pressure are applied to the ACF-bump connecting portion to collapse the ACF so that it demonstrates conductivity for the electrical connection (FIG. 6D).

Figure 6E:
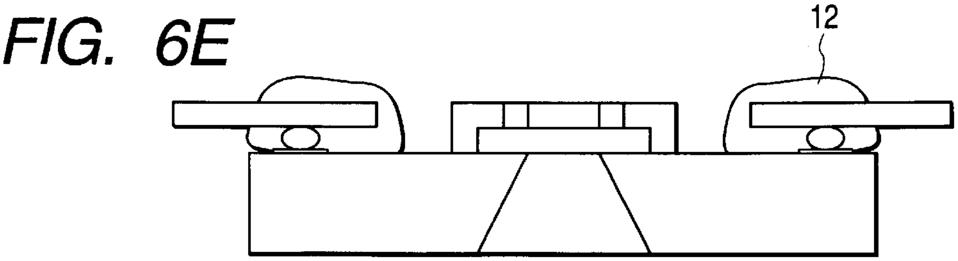

Lastly, the connected portion is sealed using sealant 12 to complete the process (FIG. 6E).

Figure 7A:
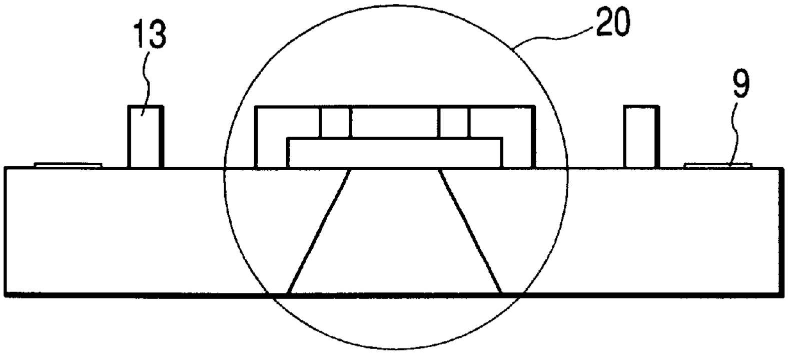
FIGS. 7A and 7B are views that illustrate the forming process of the ink jet head using a spacer in accordance with the third embodiment of the present invention.
Figure 7B:
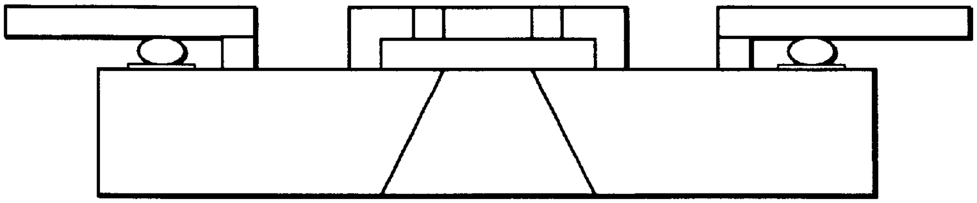

However, with this method, heat and pressure are given not only to the bump portion when the ACF is heated and pressed, but also, heat and pressure are given across the substrate and ACF. As a result, conduction is made with the substrate side to bring about drawback in some cases. Under the circumstances, therefore, as shown in FIG. 7A, it has been proposed to arrange a pattern that becomes a spacer 13 around the AL pads by use of the first and second photosensitive resin layers that form the nozzle. With the spacer 13 thus arranged, there is no possibility to allow conduction with the substrate side when the ACF is heated under pressure for bonding, which makes it possible to increase the range of conditions for the thermo-pressure bonding (FIG. 7B). Nevertheless, when the spacer 13 is formed by use of the first and second photosensitive layers, there are some cases where sealant is repelled when the sealing process is executed, because the second photosensitive resin layer has water-repellency. Here, therefore, the partial hydrophilic process of the present invention is applied to the spacer 13 in order to prevent the sealant from being repelled, hence making the complete sealing process and the prevention of conduction across the substrate and the ACF compatible. A circle surrounds the nozzle portion 20 for the indication thereof.

As the executable mode of the present embodiment, the spacer is formed by the hydrophilic process having the same steps as those of the partial hydrophilic process for the nozzle portion of the first embodiment. The spacer is formed in a pattern of 50 $\mu$m square on the mask, and the surface is made hydrophilic by arranging a line of 2 $\mu$m each at intervals of 8 $\mu$m. When the chip thus obtained is electrically assembled by use of the ACF, there does not occur any drawback due to conduction across the substrate and the ACF. Further, there is no case at all where sealant is repelled from the spacer when the sealing process is executed.

As described above, in accordance with the present invention, it becomes possible to enhance print quality with the formation of a the water-repellent portion and a hydrophilic portion on the nozzle surface of an ink jet head in exact positioning precision without increasing the number of processing steps.

What is claimed is:

1. A method for manufacturing an ink jet head provided with a discharge port member having discharge ports for discharging ink arranged therefor, comprising the steps of:

forming an ink flow-path pattern from a soluble resin on a substrate having an ink discharge pressure generating element formed thereon;

laminating on the ink flow-path pattern a first photosensitive resin layer for forming the discharge port member;

laminating on the first photosensitive resin layer a second photosensitive resin layer having water-repellency for forming the discharge port member;

forming a first latent-image pattern reaching the bottom portion of the first photosensitive resin layer, and a second latent-image pattern extending beyond the second photosensitive resin layer but not reaching the bottom portion of the first photosensitive resin layer, by subjecting the first photosensitive resin layer and second photosensitive resin layer to a pattern exposure simultaneously by use of a mask, while controlling partially the exposed area of the exposed portion at the time of applying the pattern exposure so as to make depths of latent images produced by the pattern exposure different;

forming a hydrophilic portion having the discharge port and first photosensitive resin layer exposed by developing the pattern-exposed first photosensitive resin layer and second photosensitive resin layer; and removing the ink flow-path pattern formed from the soluble resin.

2. A method for manufacturing an ink jet head according to claim 1, wherein the first photosensitive resin layer and second photosensitive resin layer are negative-type photosensitive resin layers.

3. A method for manufacturing an ink jet head according to claim 1, wherein the second latent-image pattern is formed by a pattern-exposure with a resolution smaller than the resolution limit of the first photosensitive resin layer.

4. A method for manufacturing an ink jet head according to claim 1, wherein the thickness of the first photosensitive resin layer is greater than the thickness of the second photosensitive resin layer.

5. A method for manufacturing an ink jet head according to claim 2, wherein the thickness of the first photosensitive resin layer is 10 or more times the thickness of the second photosensitive resin layer.

6. A method for manufacturing an ink jet head according to claim 1, further comprising the step of:

making an electrical connection by use of an anisotropic conduction sheet after the discharge port member is formed.

7. A method for manufacturing an ink jet head according to claim 6, further comprising the step of:

arranging a spacer between the area of the substrate having the second photosensitive resin layer partially removed and the anisotropic conduction sheet when the electrical connection is made by use of the anisotropic conduction sheet.

* * * * *

UNITED STATES PATENT AND TRADEMARK OFFICE

CERTIFICATE OF CORRECTION

PATENT NO. : 6,766,579 B2
DATED : July 27, 2004
INVENTOR(S) : Norio Ohkuma

It is certified that error appears in the above-identified patent and that said Letters Patent is hereby corrected as shown below:

Columns 5 and 6,

Table 2, Figure entitled “Fluoric epoxy resin A”: “$C_8F_{13}$” should read -- $C_6F_{13}$ --;
Table 2, Figure entitled “Fluoric epoxy resin B”: “$CH_2$” (first occurrence) should read -- $CH_3$ --; “$-)_{23}$” should read -- $-)_{25}$ --; and “$CH-)_{80}$” should read -- $CH-)_{50}$ --.

Column 7,

Line 6, “methyl,” should read -- methyl --.

Signed and Sealed this

Twenty-third Day of August, 2005

JON W. DUDAS

*Director of the United States Patent and Trademark Office*